(12) United States Patent
Reese et al.

(10) Patent No.: US 6,286,857 B1
(45) Date of Patent: Sep. 11, 2001

(54) TRUNNION AIR-RIDE SUSPENSION

(75) Inventors: Jay D. Reese, Trussville; Mohammad G. Zarei, Birmingham, both of AL (US)

(73) Assignee: Fontaine Specialized Inc., Springville, AL (US)

( * ) Notice: Subject to any disclaimer, the term of this patent is extended or adjusted under 35 U.S.C. 154(b) by 0 days.

(21) Appl. No.: 09/416,674

(22) Filed: Oct. 12, 1999

(51) Int. Cl.$^7$ ........................................................ B60G 5/00
(52) U.S. Cl. ......................................... 280/683; 280/124.128
(58) Field of Search .................................. 280/677, 678, 280/683, 685, 124.11, 124.111, 124.128, 124.13, 124.131, 124.132, 124.158, 124.153, 124.167, 124.156, 682, 687

(56) References Cited

U.S. PATENT DOCUMENTS

| | | |
|---|---|---|
| 2,823,926 | 2/1958 | Stover . |
| 3,063,732 | 11/1962 | Harbers et al. . |
| 3,140,880 | 7/1964 | Masser . |
| 3,197,231 * | 7/1965 | Holzman . |
| 3,326,527 | 6/1967 | Jenkins . |
| 3,406,980 | 10/1968 | Murray . |
| 3,511,332 * | 5/1970 | Hickman . |
| 3,964,764 | 6/1976 | Rickardsson . |
| 4,047,736 * | 9/1977 | Prive ..................................... 280/683 |
| 4,166,640 | 9/1979 | Van Denberg . |
| 4,500,112 | 2/1985 | Raidel . |
| 4,691,937 | 9/1987 | Raidel . |
| 5,083,812 | 1/1992 | Wallace et al. . |
| 5,971,425 * | 10/1999 | Dinsley et al. ........................ 280/678 |

OTHER PUBLICATIONS

Murray "Professional" brochure, Murray Trailers, Stockton, CA, date unknown.

* cited by examiner

*Primary Examiner*—Paul N. Dickson
(74) *Attorney, Agent, or Firm*—Piper Marbury Rudnick & Wolfe (57) ABSTRACT

A trunnion suspension arrangement for a vehicle featuring a pair of generally parallel frame rails, such as a transport trailer, includes, for each frame rail, a trailing beam with a leading portion and a trailing portion. A hanger is attached to the frame rail and the leading portion of the trailing beam is pivotally connected to the hanger by a spherical bearing. An air spring and a shock absorber are connected between the trailing portion of the trailing beam and the frame rail. An axle is connected to the trailing beam between the hanger and the air spring. A bumper featuring arcuate side members is attached to the trailing portion of the trailing beam so that it partially surrounds the air spring. A cage, which is connected to the frame rail, surrounds the bumper and features slide pads that are engaged by the arcuate side members of the bumper to limit transverse horizontal travel of the trailing portion of the trailing beam.

22 Claims, 9 Drawing Sheets

TRUNNION AIR-RIDE SUSPENSION

BACKGROUND OF THE INVENTION

The invention relates generally to suspension systems for wheeled vehicles, and, more particularly, to a trunnion air-ride suspension system for a transport trailer.

It is known in the art that trailers for transporting large specialized vehicles and equipment for construction, farming and similar operations may be equipped with "trunnion suspensions." Trunnion suspensions feature one or more trunnion suspension groupings. A trunnion suspension grouping has two axles with four tires on each axle and the axles placed side by side with the longitudinal axes of the axles aligned. The two axles of a trunnion suspension grouping are mounted to separate trailer frame rails. As a result, each axle may move independently of the other axle.

A trunnion suspension grouping will give superior hauling capacity compared to a more conventional single "trailer-width" axle with four tires. As with trailer-width axles, a plurality of trunnion suspension groupings may be positioned in tandem to increase the hauling capacity of the trailer. The number of tandem axles that may be utilized under a trailer is limited by the trailer length. As a result, a trailer of a given length will possess a greater hauling capacity when equipped with a trunnion suspension instead of a trailer-width axle arrangement.

An example of a transport trailer equipped with a trunnion suspension is presented in U.S.

Pat. No. 3,406,980 to Murray. The trunnion arrangement of the Murray '980 patent utilizes two pairs of axles with one pair mounted in tandem adjacent one side of the trailer and the other pair mounted in tandem adjacent the opposite side of the trailer. The two pairs of axles are aligned so that a trunnion suspension with two trunnion suspension groupings is formed. Each axle of a tandem pair is mounted at opposite ends of a support beam. The support beam is mounted at its center via a transversely positioned pivot pin to a hanger or saddle extending down from the trailer frame. The pivot pin serves as a fulcrum so that the support beam may pivot about a transverse, horizontal axis. Each of the pair of axles is attached to the support beam by a pivot connection so that they may rotate about a horizontal axis that is parallel to the direction of vehicle travel.

While the transport trailer of the Murray '980 patent is capable of accommodating heavy payloads, the suspension provides a rough ride and little shock absorption.

Air spring suspensions of the rigid beam type, sometimes referred to as "air-ride" suspensions, have been known for many years in the truck and trailer industry. Their advantages are well known and include ride comfort, stability and the ability to cushion their loads from shocks due to irregularities in road surfaces. Prior art air spring suspensions have not been utilized in a trunnion arrangement, however.

Air spring suspensions typically include an elongated and substantially rigid beam, an air spring located at one end of the beam, a hanger bracket located at the other end of the beam and connected to the vehicle frame, a pivotal connection between the hanger bracket and the beam and an axle connected to the beam intermediate the ends of the beam. In some instances the beam is configured with the end connected to the hanger bracket in the forward direction (the direction of vehicle travel) and the end portion supporting the air spring in the rearward direction. When such a configuration is present, the suspension is commonly referred to as a "trailing beam" or "trailing arm" suspension.

Air springs are essentially air-inflated bags that support the vertical load of the trailer and its cargo. An air spring by itself lacks lateral stability, however. As such, it is necessary to provide mechanical means for controlling all lateral forces and force components on the air spring and the rear portion of the beam of a trailing arm suspension. To accomplish this function, prior art trailing arm suspensions have utilized a complicated system of torque rods, lateral stabilizer bars, bolsters and the like. These multiple components take up a significant amount of space under the vehicle frame. As a result, they are not well suited for use in a trunnion arrangement given the space limitations inherent in such a design. In addition, the prior art trailing arm suspensions are expensive to manufacture, install and maintain.

Accordingly, it is an object of the present invention to provide a trunnion suspension system for a transport trailer that stabilizes and cushions the trailer load while providing a smooth ride.

It is another object of the present invention to provide a trunnion suspension system that utilizes air springs.

It is another object of the present invention to provide a trailing arm suspension that is compact so that it may be used in a trunnion arrangement.

It is another object of the present invention to provide a trunnion air-ride suspension that is economical to manufacture, install and maintain.

SUMMARY OF THE INVENTION

The present invention is directed to a suspension for supporting a vehicle frame, such as for a transport trailer, on an axle. The suspension may be utilized to attach a pair of axles to a pair of generally parallel vehicle frame rails in a trunnion arrangement. The suspension features a trailing beam featuring a leading portion and a trailing portion. A hanger is connected to a frame rail and the leading portion of the trailing beam is pivotally connected to the hanger by a spherical bearing. An air spring and a shock absorber are connected between the trailing portion of the trailing beam and the frame rail. An axle is mounted to the trailing beam between the hanger and the air spring. A bumper is attached to the trailing portion of the trailing beam and a cage is attached to the frame rail. The cage is sized to at least partially surround the bumper to prevent movement of the trailing portion of the trailing beam in a horizontal direction transverse to a direction of vehicle travel while permitting movement in a vertical direction.

The bumper includes a pair of arcuate side members that are connected to the trailing portion of the trailing beam. The bumper also includes a rear member connected to the trailing portion of the trailing beam behind the air spring and a C-shaped member connected to the arcuate side members and the rear member. The cage features a pair of side guides that are attached to the frame rail with a pair of slide pads mounted one each on the inward-facing surfaces of the side guides. The cage also features a rear guide attached to the frame rail and a C-shaped ring guide attached to the two side and rear guides. The arcuate side members of the bumper engage the pair of slide pads, which are preferably made of Ultra High Molecular Weight (UHMW) plastic, and slide there along during articulation of the suspension.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

The rear portion of a transport trailer equipped with an embodiment of the trunnion air-ride suspension of the present invention is indicated in general at 20. Such a trailer is ideally suited for hauling heavy equipment or specialty vehicles of the type typically used in construction or farming operations. As is known in the art, the front portion of the trailer (not shown) features a gooseneck arrangement so that the trailer may be attached to a suitable pulling vehicle such as a tractor truck. The middle portion of the trailer features a lowered deck 22 upon which the load is positioned. The lowered positioning of the deck provides the loaded trailer with greater stability.

Figure 1:
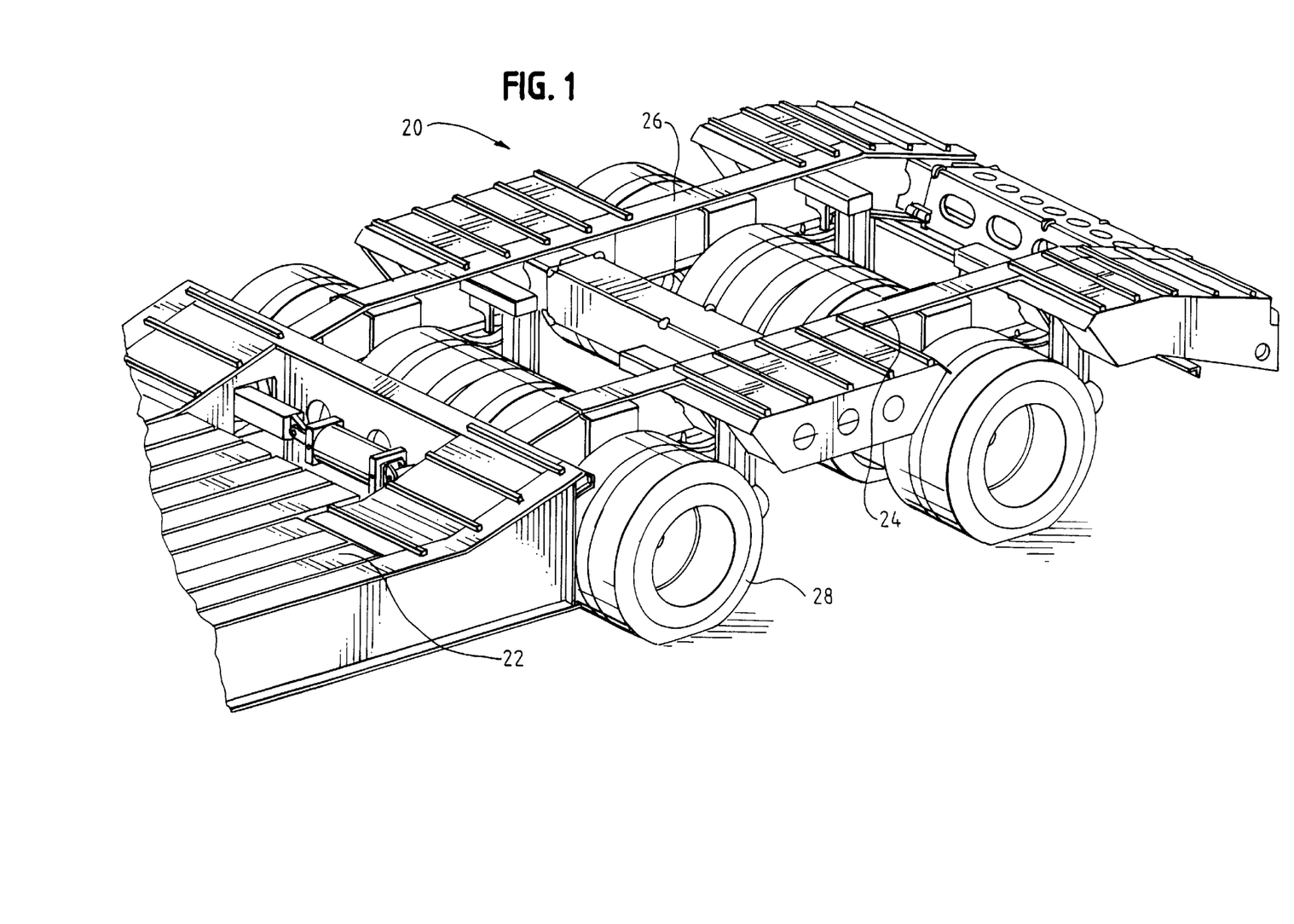
FIG. 1 is a partial perspective view of the rear portion of a transport trailer equipped with an embodiment of the trunnion air-ride suspension of the present invention.

The rear portion of the trailer features a pair of frame rails 24 and 26 to which the suspension is attached. The trailer of FIG. 1 features a trunnion suspension with two trunnion groupings arranged in tandem. As a result, the trailer is supported by sixteen tires 28. This provides the trailer with superior hauling capacity compared to a tandem axle arrangement that uses more conventional trailer-width axles. It is to be understood that while two trunnion groupings are illustrated and described herein, the suspension of the present invention could feature a single trunnion grouping or more than two trunnion groupings.

Each trunnion grouping includes two axles aligned by their longitudinal axes. Four tires are mounted to each axle. One axle of the grouping is mounted to frame rail 24 while the other axle of the grouping is mounted to frame rail 26. In order to eliminate redundancy, the suspension of the present invention will be discussed in terms of the leading or front axle that is mounted to frame rail 24, illustrated at 30 in FIG. 2, with the understanding that the remaining axles are supported by similar suspension arrangements.

Figure 2:
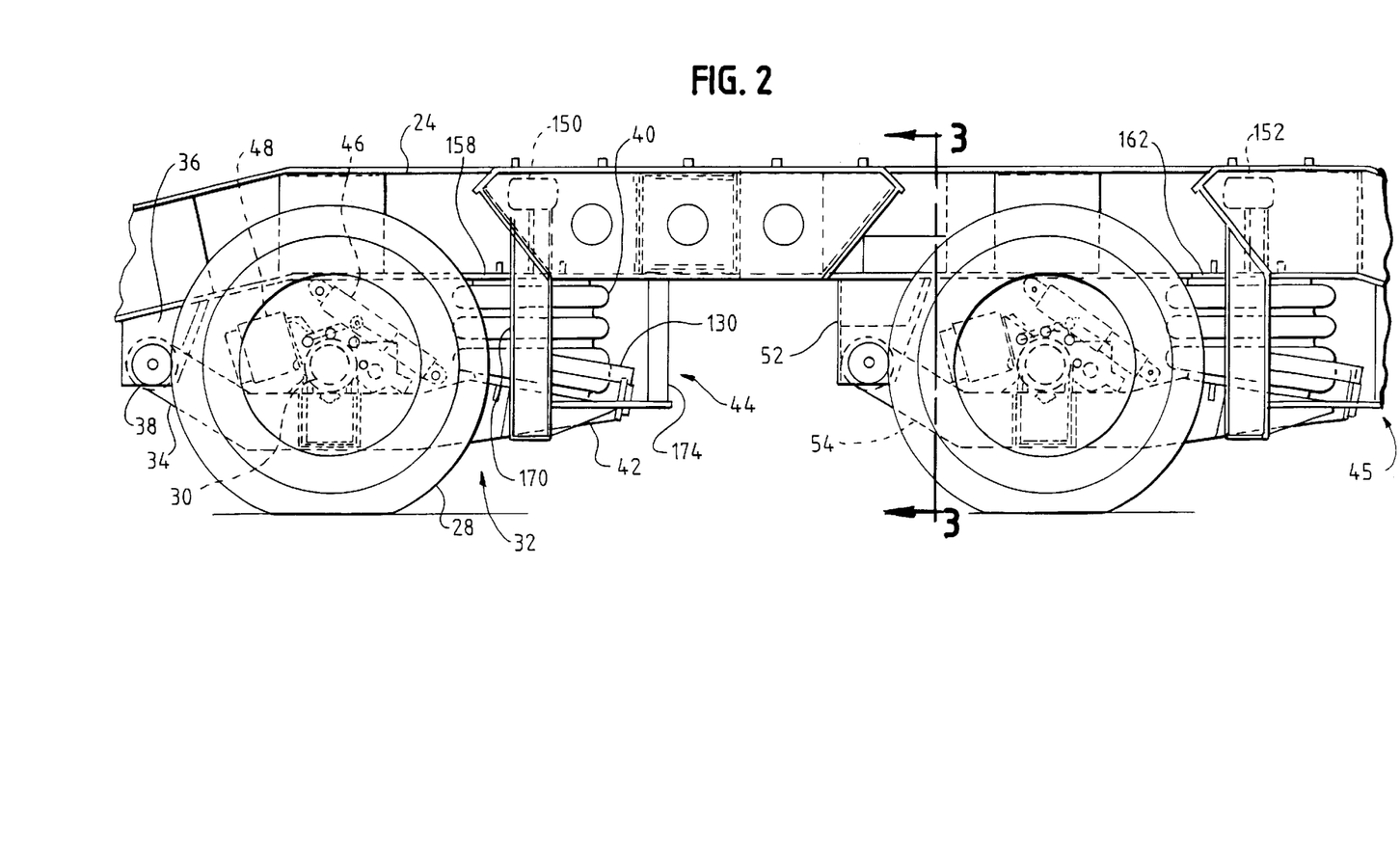
FIG. 2 is an enlarged side elevation view of suspension of FIG. 1.

As illustrated in FIG. 2, a semi-rigid trailing beam, indicated in general at 32, is mounted to frame rail 24 by its leading portion 34 via a hanger 36 and a spherical bearing 38. An air spring 40 (also see FIG. 3) is mounted between the trailing portion 42 of the beam 32 and the trailer frame 24. As will be described in greater detail, a cage, indicated in general at 44, is mounted to the frame rail 24 and partially surrounds the air spring 40 and the trailing portion 42 of the beam 32. A shock absorber 46 is also connected between the trailing portion of the beam and the frame rail. The axle 30 is secured to the middle portion of beam 32 by welding or a clamping arrangement (using, for example, U-bolts). A braking system 48 is also connected to axle 30. A suitable braking system is available from Allied Signal of Morristown, N.J.

Figure 4:
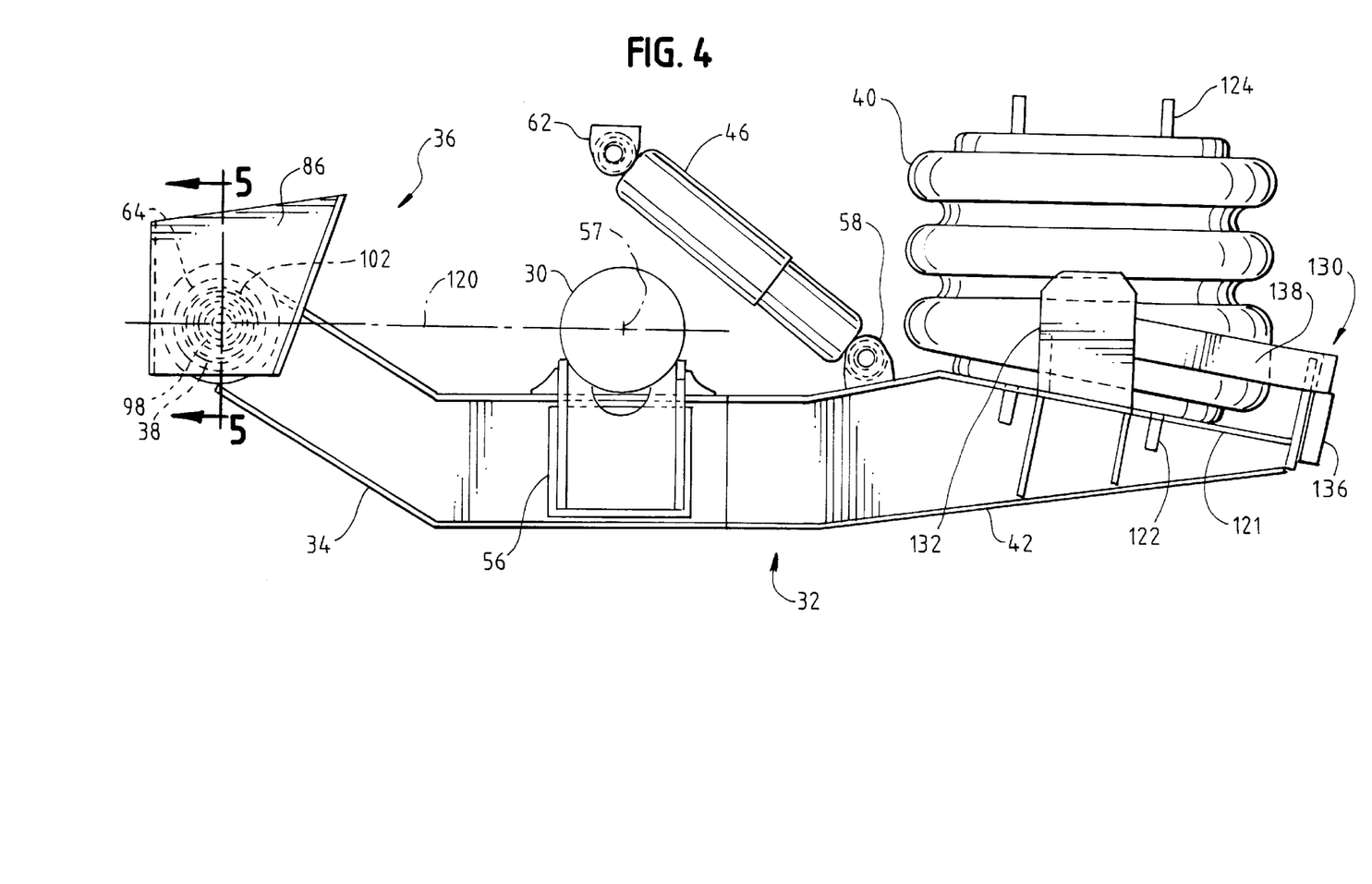
FIG. 4 is an enlarged side elevation view of the beam assembly of the suspension of FIG. 2.

Turning to FIG. 4, the beam assembly of the suspension includes the trailing beam 32 which may be constructed from a semi-rigid material such as steel. An axle seat 56 is welded to the top and sides of the trailing beam and receives axle 30. Axle 30 is secured to seat 56 by welds and features a longitudinal axis 57. A lower shock absorber bracket 58 is welded to the trailing beam 32 behind axle seat 56 and axle 30 and is pivotally connected to the bottom of shock absorber 46. An upper shock absorber bracket 62 is welded to the bottom of frame rail 24 (FIGS. 1 and 2) and is pivotally connected to the top of shock absorber 46. The angular orientation of shock absorber 46 allows both the vertical and horizontal components of the movement of the trailing beam 32 to be dampened.

Figure 5:
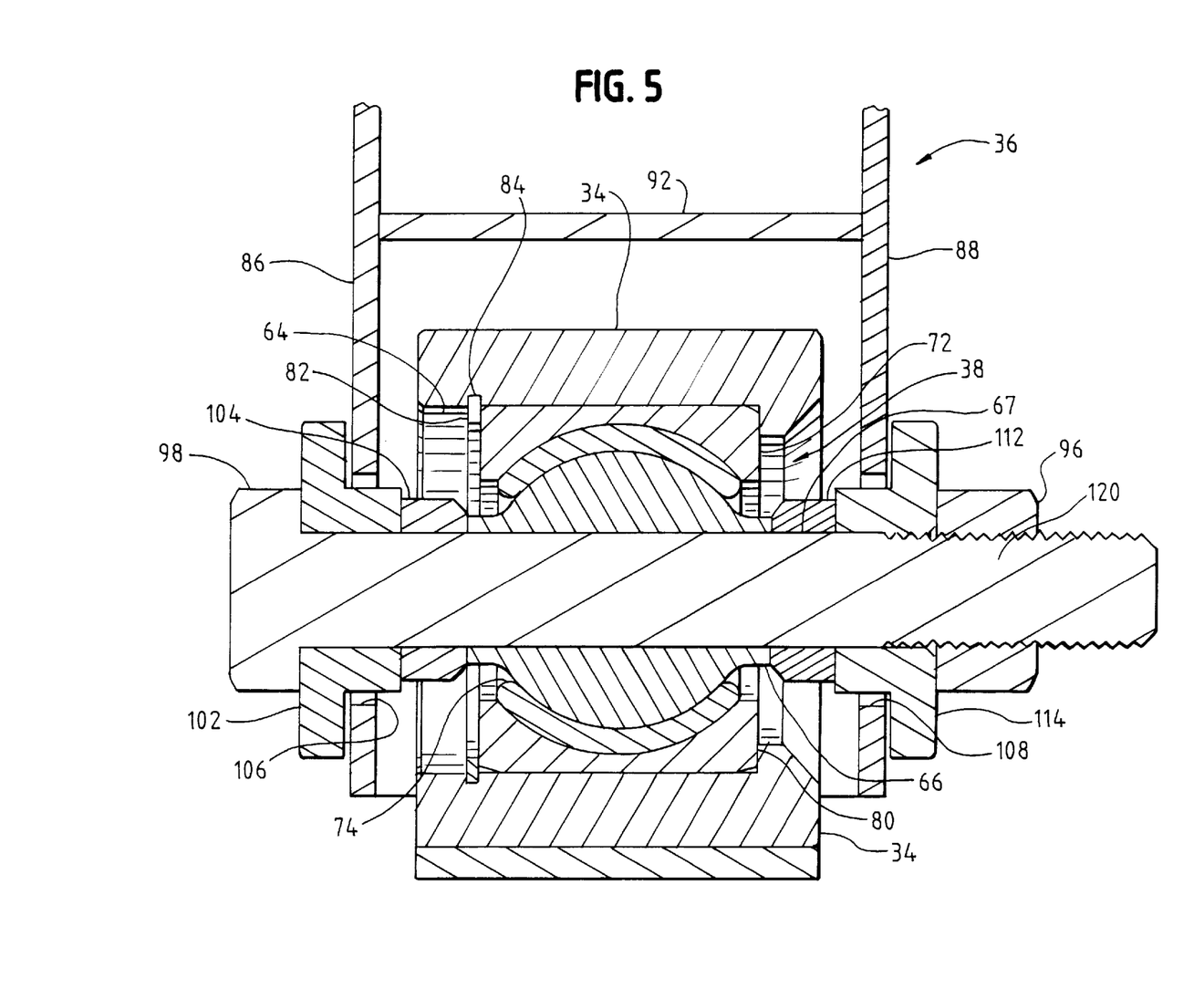
FIG. 5 is a sectional view of the spherical bearing assembly, hanger and beam of the beam assembly of FIG. 4 taken along line 5—5.

As illustrated in FIG. 2, the top of hanger 36 is welded to the bottom of frame rail 24. The leading portion 34 of the beam 32 is pivotally connected to hanger 36 by a spherical bearing 38. Suitable spherical bearings are available, for example, from GMT of Germany. As illustrated in FIGS. 4 and 5, the leading portion 34 of the trailing beam has a cylindrical chamber 64 formed therein.

Turning to FIG. 5, the spherical bearing, indicated in general at 38, includes a generally spherical inner race 66 with an aperture 67 therethrough, a cylindrical outer race 72 housing a socket and a spherical rubber member 74 having a wall with an arcuate cross section. The three components are sized so that the inner race 66 may pivot within the outer race 72 with the assistance of rubber member 74 in a ball and socket fashion. The chamber 64 of the beam leading portion 34 is sized to slidably receive the spherical bearing 38. The spherical bearing is secured within the chamber 64 on one end by an annular ledge 80 and on the other end by a deformable and removable retaining ring 82. After the spherical bearing 38 is slid into position within chamber 64, the retaining ring 82 is snapped into engagement with an annular groove 84 formed in the interior surface of the wall of chamber 64. The retaining ring 82 may be deformed and withdrawn from groove 84 to permit removal of the spherical bearing 38 from chamber 64 for servicing or replacement.

As illustrated in FIG. 5, hanger 36 features a pair of spaced plate members 86 and 88 joined by cross plate 92. Bearing 38, and therefore the leading portion 34 of beam 32, is secured between the spaced plate members by a nut and bolt, indicated at 96 and 98, respectively. More specifically, a collar 102 and spacer 104 are placed over bolt 98. Bolt 98 is passed through an opening 106 in plate member 86, the aperture 67 of inner race 66 and an opening 108 in plate member 88. A second spacer 112, collar 114 and nut 96 are placed on bolt 98 to hold the assembly together. The spherical bearing 38 permits the trailing beam to pivot about the longitudinal axis of bolt 98 as well as about a horizontal axis indicated at 120 in FIGS. 4 and 5. As a result of the latter, axle 30 (FIG. 4) may also pivot about axis 120 in a vertical plane that is perpendicular to the direction of vehicle travel.

Figure 6:
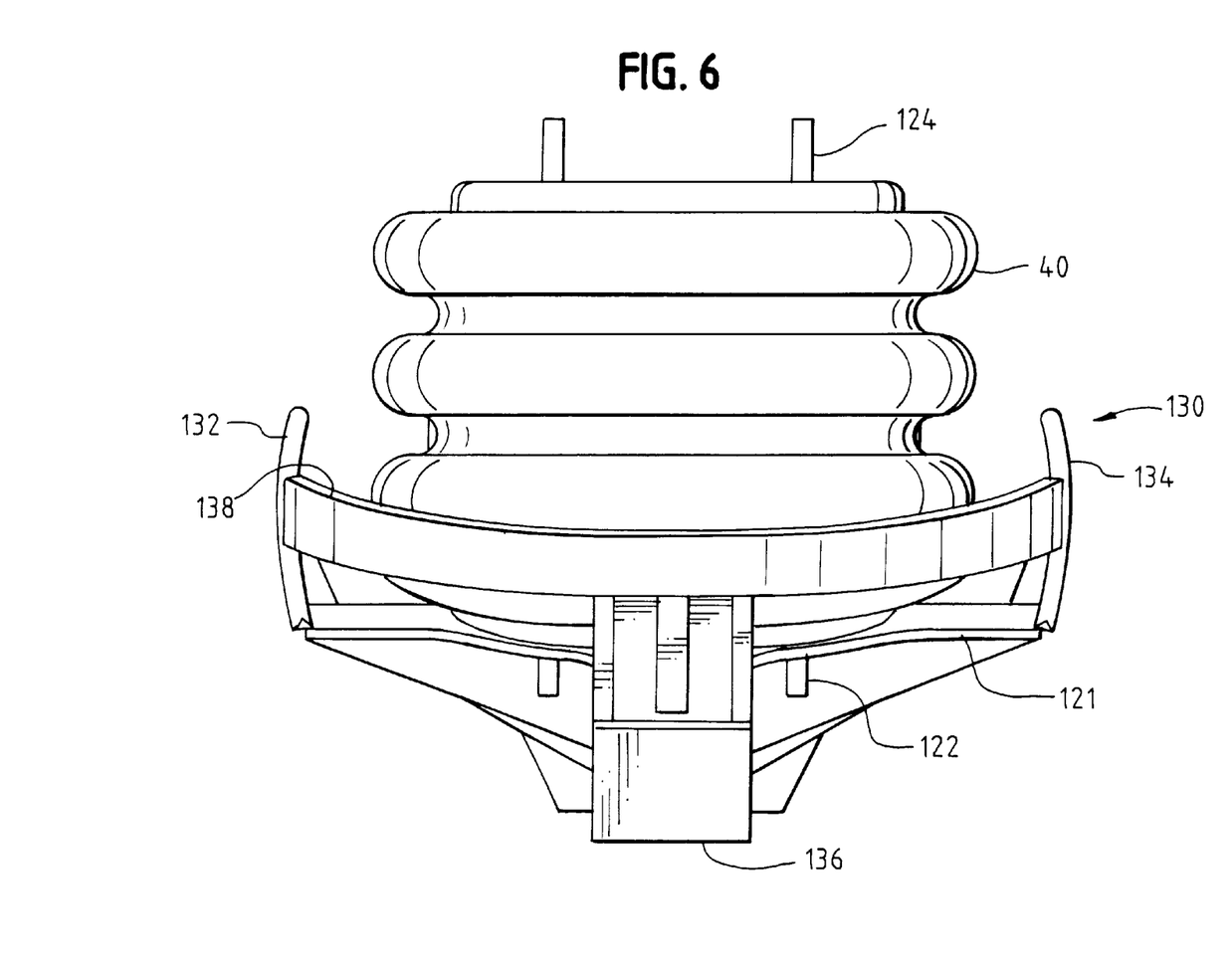
FIG. 6 is a rear elevation view of the beam assembly of FIG. 4.

Referring to FIGS. 4 and 6, a bottom plate 121 is formed on the rear portion 42 of trailing beam 32. Air spring 40 is secured to the bottom plate 121 by bolts 122. As will be described in greater detail, the top of air spring 40 is secured to frame rail 24 by bolts 124. As illustrated in general at 130, a bumper surrounds the rear half of air spring 40. Bumper 130 features a pair of arcuate side members 132 and 134, which are preferably constructed of steel, welded to bottom plate 121. A rear bumper member 136, also preferably constructed of steel, is welded to the trailing end of bottom plate 121. A C-shaped member 138, preferably constructed from a strip of steel, is welded to the two arcuate side members 132 and 134 and the rear bumper member 136. The function of bumper 130 will be explained below.

Figure 7:
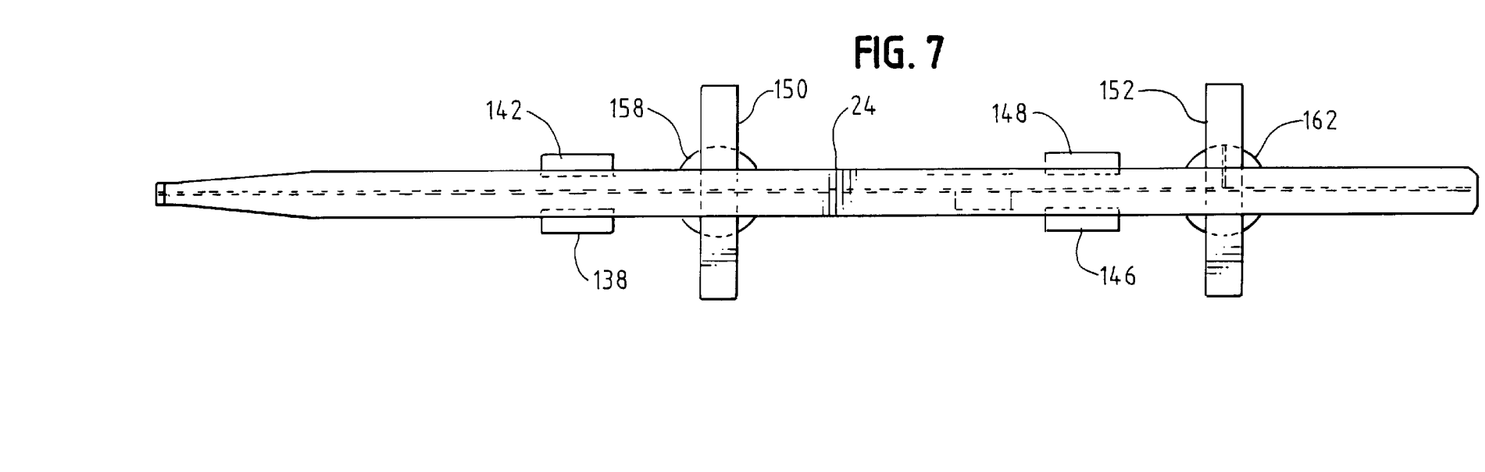
FIG. 7 is a top elevation view of a frame rail of the transport trailer of FIG. 1.
Figure 8:
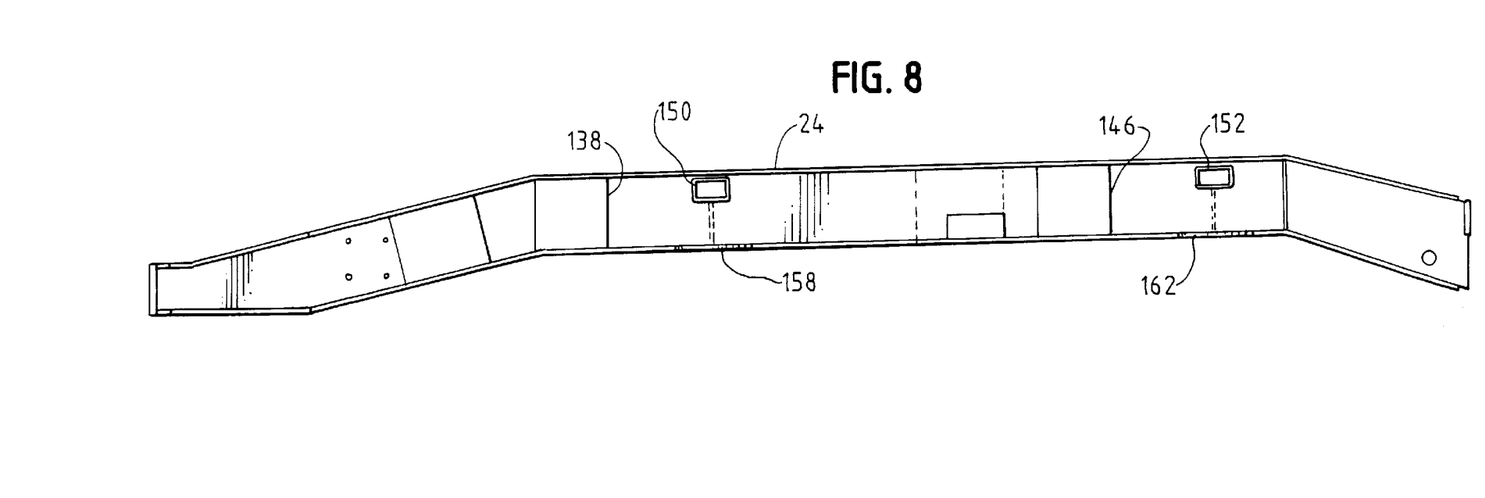
FIG. 8 is a side elevation view of the frame rail of FIG. 7.

The details of frame rail 24 are illustrated in FIGS. 7 and 8. Frame rail 26 features a similar construction. A pair of scuff plates 138 and 142 for the innermost tires of the leading axle are constructed of a material such as rubber, plastic or steel and are mounted to opposite sides of the frame rail 24. A pair of scuff plates for the innermost tires of the trailing axle are indicated at 146 and 148. The scuff plates prevent damage to the innermost tires in the event that extreme deflection of the axle occurs due to obstacles on the road surface.

Cross members for the front axle and rear axle are illustrated at 150 and 152, respectively. Cross members 150 and 152 are preferably constructed from rectangular steel tubing and welded to frame rail 24. As illustrated in FIG. 2, cross members 150 and 152 support cages 44 and 45. Top plates for the air springs of the leading and trailing axles are illustrated at 158 and 162 in FIGS. 7 and 8. Plates 158 and 162 are preferably constructed of steel and are welded to frame rail 24. Top plates 158 and 162 feature holes that receive the bolts on the top of the air springs, such as bolts 124 for air spring 40. As a result, the top of the air springs are secured to the top plates as illustrated in FIG. 2.

Figure 3:
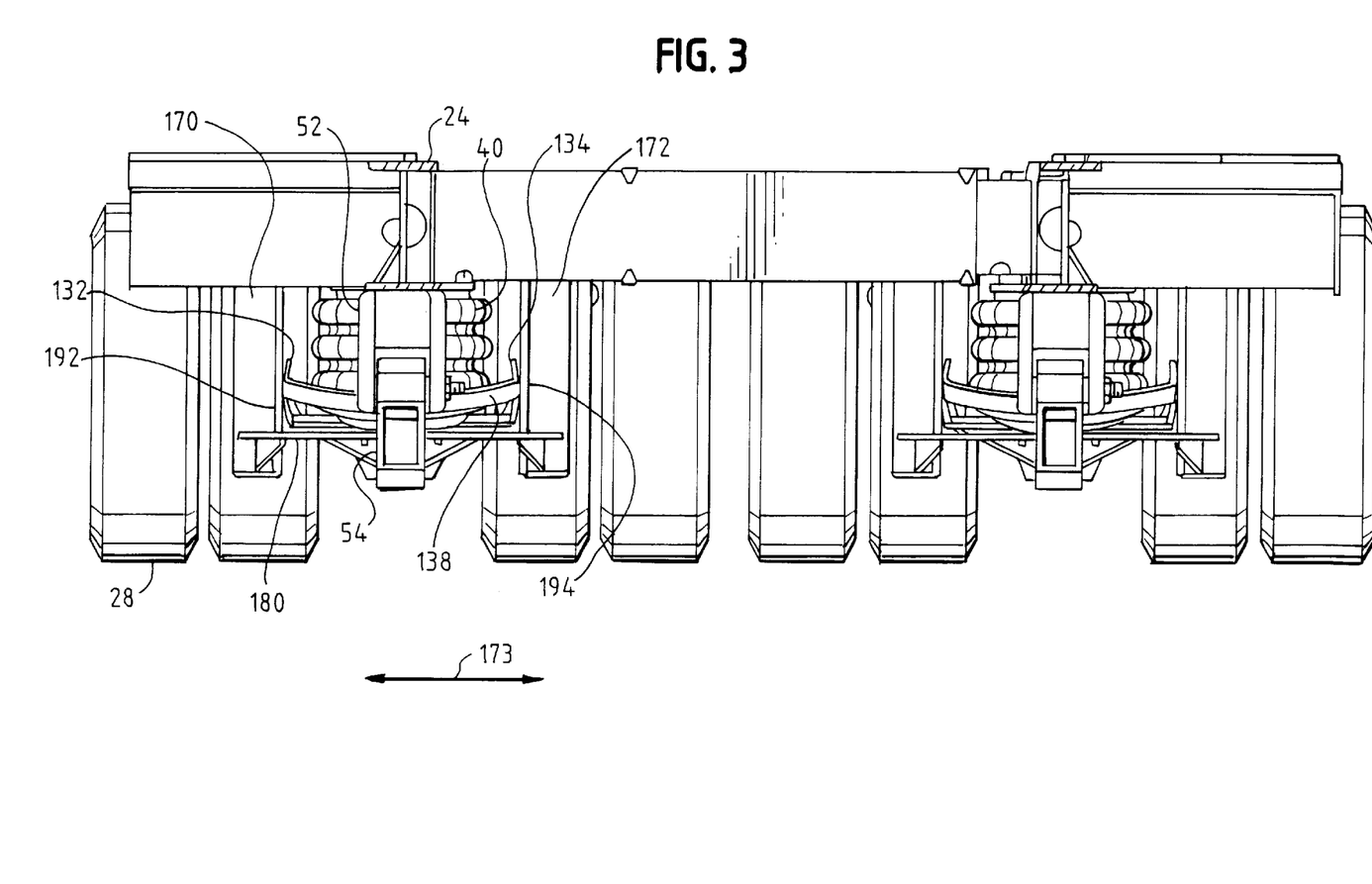
FIG. 3 is a sectional view of the suspension of FIG. 2 taken along line 3—3.
Figure 9:
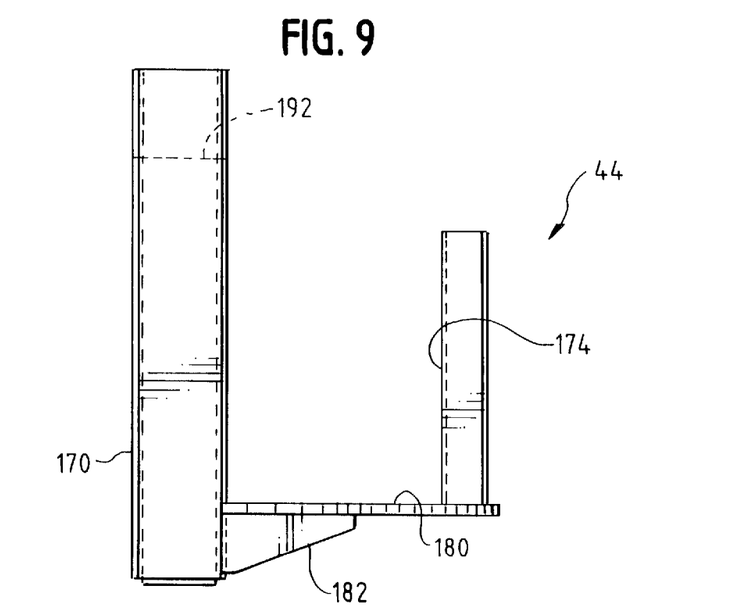
FIG. 9 is a side elevation view of the cage of the suspension of FIG. 2.
Figure 10:
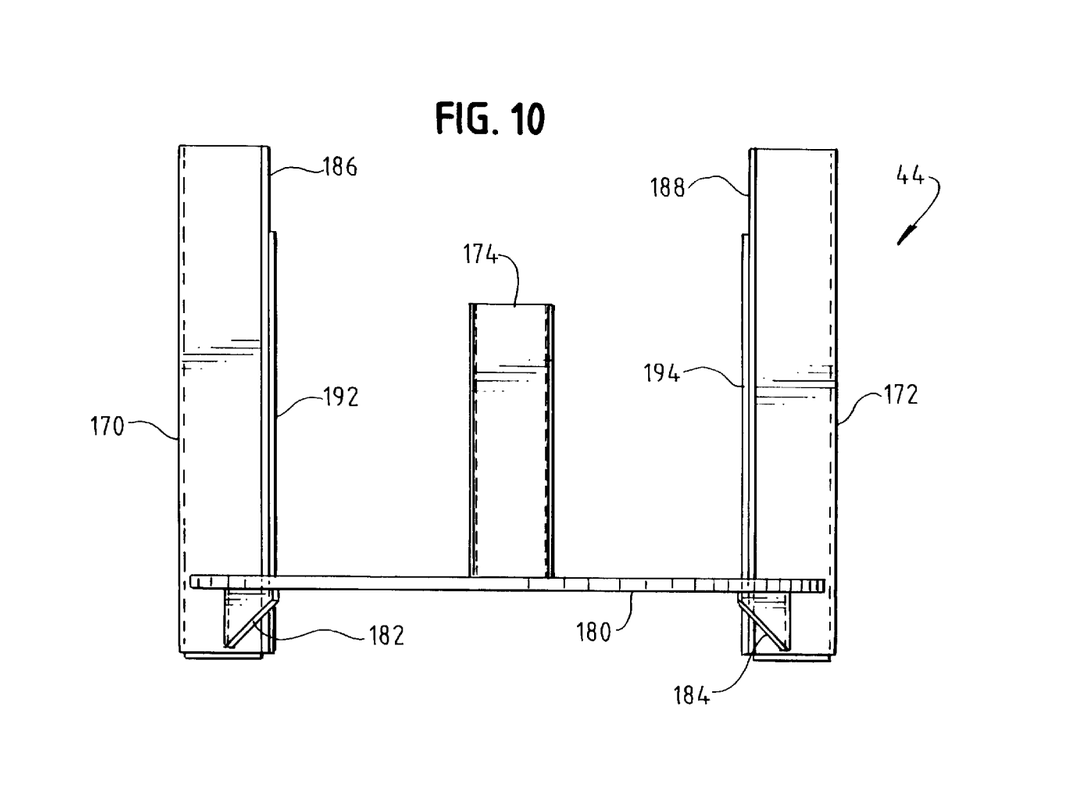
FIG. 10 is a rear elevation view of the cage of FIG. 10.
Figure 11:
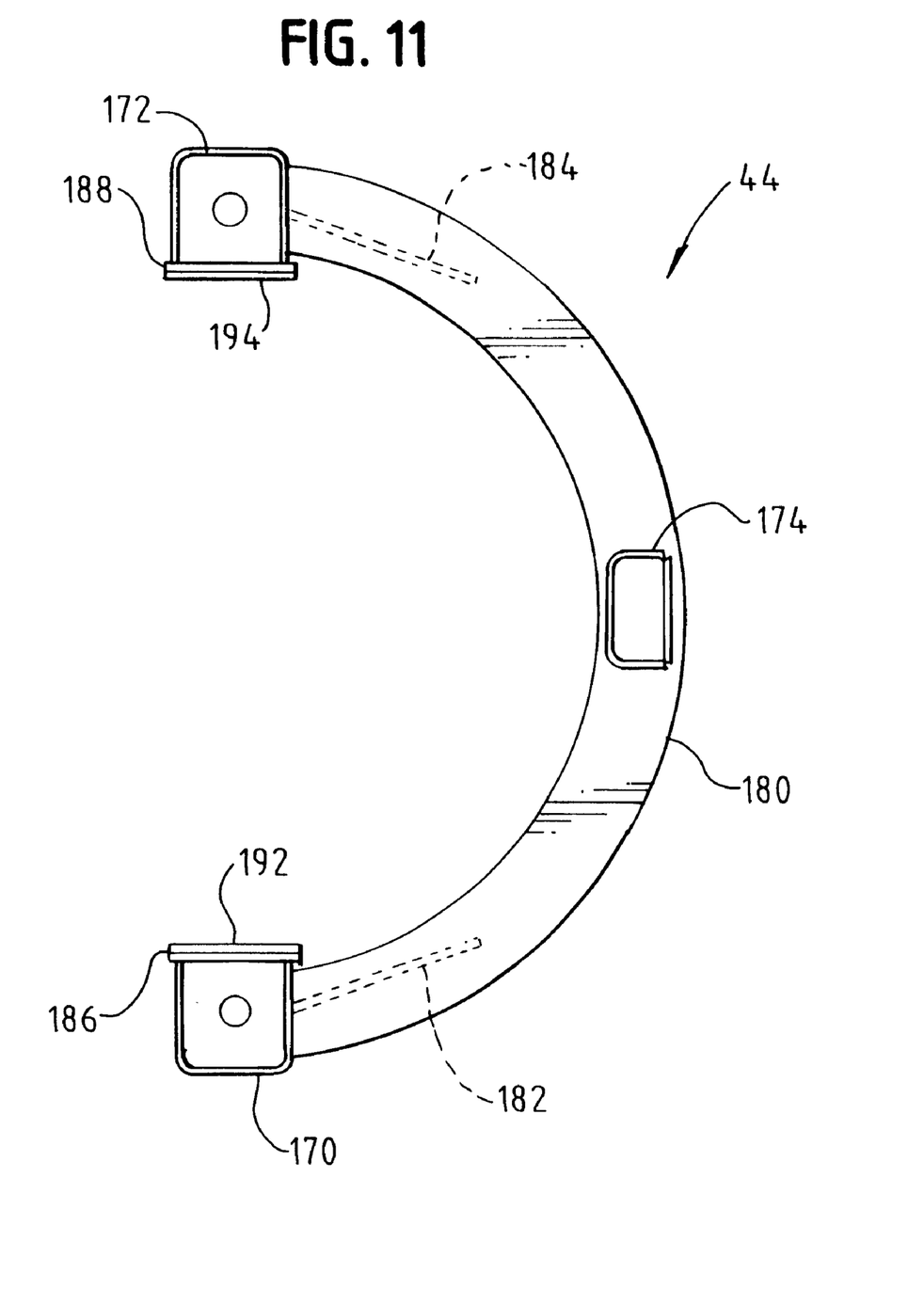
FIG. 11 is a top plan view of the cage of FIGS. 10 and 11.

The details of a cage, indicated in general at 44, are presented in FIGS. 9–11. The cage features two side guides 170 and 172 as well a rear guide 174. The two side and rear guides are preferably constructed from steel tubes. A C-shaped ring guide 180 is welded to the two side and rear guides. A pair of braces 182 and 184 assist in securing the ring guide 180 to the side guides 170 and 172. Slide pads 192 and 194, constructed of a wear-resistant and low-friction material such as Ultra High Molecular Weight (UHMW) plastic, are mounted to the surfaces 186 and 188 respectively. As illustrated in FIG. 2, the tops of the side guides 170 and 172 are welded to cross member 150 (see also FIG. 7) while the rear guide 174 is welded to frame rail 24. As a result, as illustrated in FIGS. 2 and 3, cage 44 surrounds the rear half of air spring 40 and bumper 130 with the arcuate side members 132 and 134 of the latter contacting the slide pads 192 and 194 of the cage side guides 170 and 172. As a result, bumper 130 is "trapped" within cage 44 so that movement of the trailing portion of the trailing beam, and therefore the axle, in a horizontal direction transverse to the direction of vehicle travel (see arrow 173 in FIG. 3) is prevented.

In operation, as the vehicle axle (30 in FIG. 2) moves up and down, the arcuate side members, 132 and 134 in FIG. 3, of the bumper slide along the slide pads 192 and 194 of the side guides 170 and 172 of the cage. As explained previously with reference to FIGS. 4 and 5, the spherical bearing attachment between the leading portion 34 of the trailing beam 32 and the hanger 36 permits the axle 30 to pivot in a vertical plane perpendicular to the direction of vehicle travel. As a result, the bumper also pivots in a vertical plane perpendicular to the direction of vehicle travel. The arcuate construction of bumper side members 132 and 134 allow contact to be maintained with the slide pads 192 and 194 as the axle and bumper pivots.

It should be understood that while the invention is explained in terms of a trunnion arrangement, the suspension described above could be utilized with a conventional trailer-width axle arrangement. Such an arrangement, for example, would feature a single axle attached to two trailing beams supported by the suspension of the present invention with one trailing beam attached to frame rail 24 (FIG. 1) and one trailing beam attached to frame rail 26.

While the preferred embodiments of the invention have been shown and described, it will be apparent to those skilled in the art that changes and modifications may be made therein without departing from the spirit of the invention, the scope of which is defined by the appended claims.

What is claimed is:

1. A suspension for supporting a vehicle frame on an axle comprising:
   a) a trailing beam featuring a leading portion and a trailing portion;
   b) a hanger adapted to be connected to the vehicle frame;
   c) said leading portion of said trailing beam pivotally connected to said hanger;
   d) an air spring connected to said trailing portion of said trailing beam and adapted to be connected to the vehicle frame;
   e) an axle seat adapted to mount the axle to said trailing beam between said hanger and said air spring;
   f) a bumper attached to said trailing portion of said trailing beam; and
   g) a cage adapted to be attached to the vehicle frame, said cage sized to at least partially surround said bumper to prevent movement of said trailing portion of said trailing beam in a horizontal direction transverse to a direction of vehicle travel while permitting movement of said trailing portion of said trailing beam in a vertical direction.

2. The suspension of claim 1 wherein the leading portion of said trailing beam is pivotally connected to said hanger by a spherical bearing.

3. The suspension of claim 2 wherein said bumper includes a pair of arcuate side members that are connected to said trailing portion of said trailing beam and engage said cage.

4. The suspension of claim 3 wherein said cage features a pair of side guides that are adapted to be attached to the vehicle frame with a pair of slide pads mounted one each on inward-facing surfaces of the pair of side guides with the arcuate side members of said bumper engaging said pair of slide pads.

5. The suspension of claim 4 wherein the slide pads are made of ultra high molecular weight plastic.

6. The suspension of claim 3 wherein the bumper also includes a rear member connected to said trailing portion of said trailing beam behind said air spring and a C-shaped member connected to said arcuate side members and said rear member.

7. The suspension of claim 2 wherein said hanger includes a pair of spaced plate members adapted to be connected to the vehicle frame and said leading portion of said trailing beam includes a chamber with said spherical bearing disposed therein, said leading portion of said trailing beam and said spherical bearing positioned between the pair of spaced plate members of said hanger with a bolt securing said spherical bearing to the pair of spaced plate members.

8. The suspension of claim 1 wherein said cage features a pair of side guides that are adapted to be attached to the vehicle frame with a pair of slide pads mounted one each on inward-facing surfaces of the pair of side guides with the bumper engaging the pair of slide pads.

9. The suspension of claim 8 wherein the slide pads are made of ultra high molecular weight plastic.

10. The suspension of claim 8 wherein the cage also features a rear guide and a C-shaped ring guide with said rear guide adapted to be connected to the vehicle frame and said ring guide connected to the side guides and the rear guide.

11. The suspension of claim 1 further comprising a shock absorber connected to said trailing portion of said trailing beam and adapted to be connected to the vehicle frame.

12. A trunnion suspension for a vehicle having a pair of generally parallel frame rails comprising:
   a) a first beam assembly and a second beam assembly, each of said beam assemblies adapted to be mounted to a separate one of said frame rails and including:
      i) a hanger adapted to be mounted to one of said frame rails;
      ii) a trailing beam having a leading portion and a trailing portion, the leading portion of said trailing beam pivotally connected to said hanger by a spherical bearing;
      iii) an air spring connected to the trailing portion of said trailing beam and adapted to be connected to the one of said frame rails;
   b) a first axle having a plurality of wheels mounted thereon connected to the trailing beam of the first beam assembly between the hanger and the air spring of the first beam assembly;
   c) a second axle having a plurality of wheels mounted thereon connected to the trailing beam of the second beam assembly between the hanger and the air spring of the second beam assembly;
   d) said first and second beam assemblies positioned in a side-by-side relationship so that longitudinal axes of the first and second axles are aligned.

13. The trunnion suspension of claim 12 wherein the first and second beam assemblies each also include:
   a) a bumper connected to the trailing portion of said trailing beam; and
   b) a cage adapted to be connected to the one of said frame rails, said cage sized to at least partially surround said bumper to prevent movement of the trailing portion of said trailing beam in a horizontal direction transverse to a direction of vehicle travel while permitting movement of the trailing portion of said trailing beam in a vertical direction.

14. The trunnion suspension of claim 13 wherein, for each of said first and second beam assemblies, said bumper includes a pair of arcuate side members that are connected to the trailing portion of said trailing beam and engage said cage.

15. The trunnion suspension of claim 14 wherein, for each of said first and second beam assemblies, said cage features a pair of side guides that are adapted to be mounted to the one of said frame rails with a pair of slide pads mounted one each on inward-facing surfaces of the pair of side guides with the arcuate side members of said bumper engaging said pair of slide pads.

16. The trunnion suspension of claim 15 wherein the slide pads are made of ultra high molecular weight plastic.

17. The trunnion suspension of claim 14 wherein the bumper also includes a rear member connected to the trailing portion of said trailing beam behind said air spring and a C-shaped member connected to said arcuate side members and said rear member.

18. The suspension of claim 13 wherein said cage features a pair of side guides that are adapted to be attached to the one of said frame rails with a pair of slide pads mounted one each on inward-facing surfaces of the pair of side guides with the bumper engaging the pair of slide pads.

19. The suspension of claim 18 wherein the slide pads are made of ultra high molecular weight plastic.

20. The suspension of claim 18 wherein the cage also features a rear guide and a C-shaped ring guide with said rear guide adapted to be connected to the one of said frame rails and said ring guide connected to the side guides and the rear guide.

21. The suspension of claim 12 wherein, for each of said first and second beam assemblies, said hanger includes a pair of spaced plate members adapted to be connected to the one of said frame rails and the leading portion of said trailing beam includes a chamber with said spherical bearing disposed therein, the leading portion of said trailing beam and said spherical bearing positioned between the pair of spaced plate members of said hanger with a bolt securing said spherical bearing to the pair of spaced plate members.

22. The suspension of claim 12 further comprising, for each of said first and second beam assemblies, a shock absorber connected to the trailing portion of said trailing beam and adapted to be connected to the one of said vehicle frames.

\* \* \* \* \*